(12) United States Patent
Osmekhin et al.

(10) Patent No.: US 8,485,133 B1
(45) Date of Patent: Jul. 16, 2013

(54) MOBILE PLATFORM ARRANGEMENT

(71) Applicant: Neurotar Oy, Helsinki (FI)

(72) Inventors: Sergey Osmekhin, Vantaa (FI);
Leonard Khirug, Helsinki (FI)

(73) Assignee: Neurotar Oy, Helsinki (FI)

( * ) Notice: Subject to any disclaimer, the term of this patent is extended or adjusted under 35 U.S.C. 154(b) by 0 days.

(21) Appl. No.: 13/627,082

(22) Filed: Sep. 26, 2012

(51) Int. Cl.
*A01K 1/00* (2006.01)
*A01K 1/03* (2006.01)

(52) U.S. Cl.
USPC .......................... 119/421; 119/416; 119/417

(58) Field of Classification Search
USPC .................. 119/416, 417, 418, 419, 420, 421
See application file for complete search history.

(56) References Cited

U.S. PATENT DOCUMENTS

| | | | |
|---|---|---|---|
| 1,794,951 A | 3/1931 | Freer | |
| 3,974,798 A | 8/1976 | Meetze, Jr. | |
| 5,717,202 A * | 2/1998 | Matsuda | 250/221 |
| 6,715,444 B1 * | 4/2004 | Yabusaki et al. | 119/421 |
| 7,086,350 B2 | 8/2006 | Tecott et al. | |
| 7,913,650 B2 * | 3/2011 | Conger et al. | 119/418 |
| 8,220,415 B2 * | 7/2012 | Ragatz et al. | 119/420 |

OTHER PUBLICATIONS

Hofer et al., "Experience leaves a lasting structural trace in cortical circuits", Nature, 2009, vol. 457, pp. 313-317.
Holtmaat et al., "Long-term, high-resolution imaging in the mouse neocortex through a chronic cranial window", Nature Protocols, 2009, vol. 4 No. 8 pp. 1128-1144.
Flusberg et al., "Fiber-optic fluorescence imaging", Nature Methods, 2005, vol. 2 No. 12, pp. 941-950.
Flusberg et al., "High-speed, miniaturized fluorescence microscopy in freely moving mice", Nature Methods, 2008, vol. 5, No. 11, pp. 935-938.
Yang et al., "Thinned-skull cranial window technique for long-term imaging of the cortex in live mice", Nature Protocols, 2010, vol. 5, No. 2, pp. 213-220.
Larsen et al., "The effect of volatile anaesthetics on synaptic release and uptake of glutamate", Toxicololgy Letters, 1998, vol. 100-101, pp. 59-64.
Nallasamy et al., "Functional connectivity in the brain: effects of anesthesia", Neuroscientist, 2011, vol. 17, pp. 94-106.
Chau, P-L, "New insights into the molecular mechanisms of general anaesthetics", British Journal Pharmacology, 2010, vol. 161, pp. 288-307.

(Continued)

*Primary Examiner* — Kimberly Berona
*Assistant Examiner* — Michael Wang
(74) *Attorney, Agent, or Firm* — Young & Thompson

(57) ABSTRACT

A mobile platform arrangement includes a first (mobile) platform and a second (support) platform. Both are flat-bottomed members, wherein the support platform is preferably, but not exclusively, provided with sidewalls and wherein a diameter of the support platform exceeds an outer diameter of the mobile platform at least twice. The mobile platform is advantageously positioned onto and/or within the support platform. The top surface of the support platform is provided with a friction reducing surface structure. The mobile platform is therefore adjusted to perform gliding motion along and/or over the friction reducing surface, wherein acceleration necessary for performing gliding motion is imposed to the mobile platform by an external force, provided by movement of an experimental animal within the mobile platform. The mobile platform arrangement in addition may include a mechanism for securing a conscious wake and able to move experimental animal, including a head adapter and corresponding mount.

19 Claims, 11 Drawing Sheets

OTHER PUBLICATIONS

Wienisch et al., "Two-photon imaging of neural activity in awake, head-fixed mice", 2012, Neuronal Network Analysis: Neuromethods, vol. 67, pp. 45-60.

Holscher et al., "Rats are able to navigate in virtual environments", The Journal of Experimental Biology, 2005, vol. 208, pp. 561-569.

Dombeck et al., "Functional imaging of hippocampal place cells at cellular resolution durint virtual navigation", Nature Neuroscience, 2010, vol. 13, No. 11, pp. 1433-1440.

Kendler et al., "An investigation of latent learning in a T-maze", Journal of Comparative and Physiological Psychology, 1947, vol. 40, No. 4, pp. 265-270.

\* cited by examiner

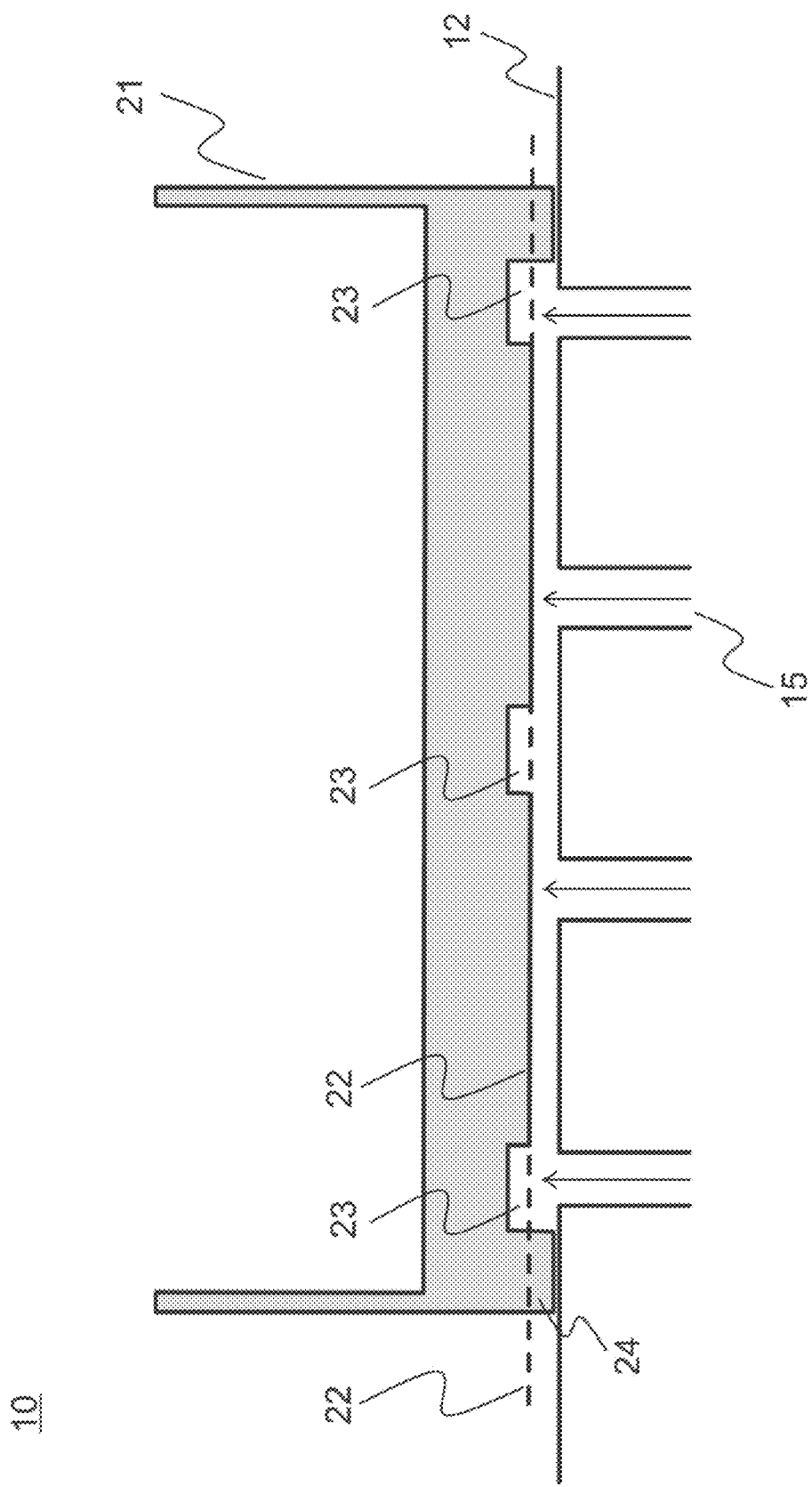

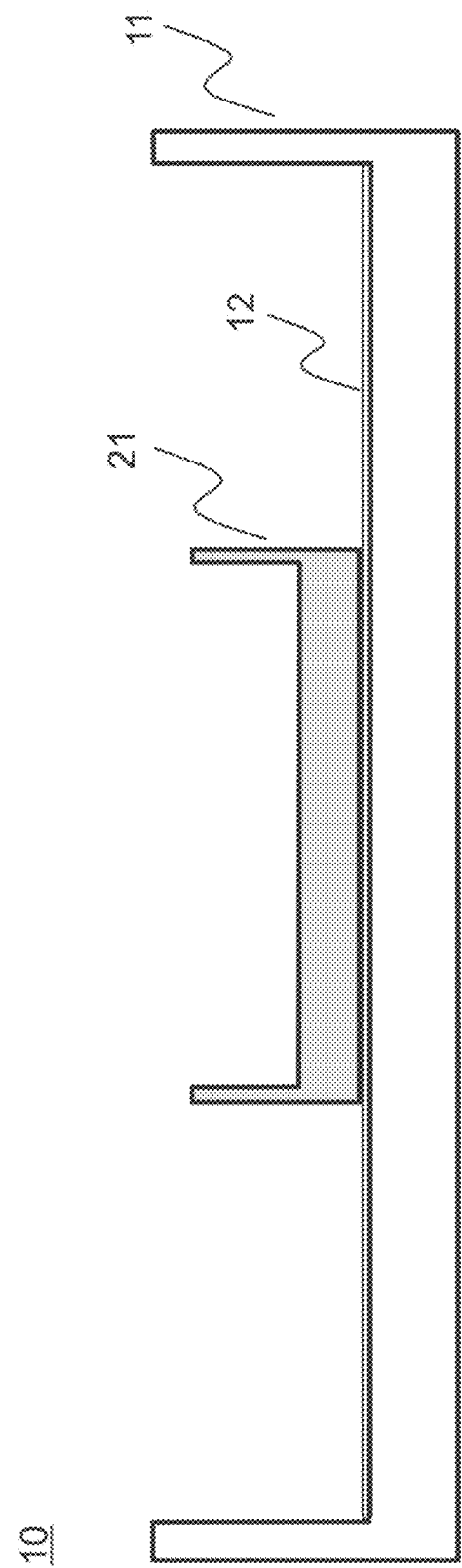

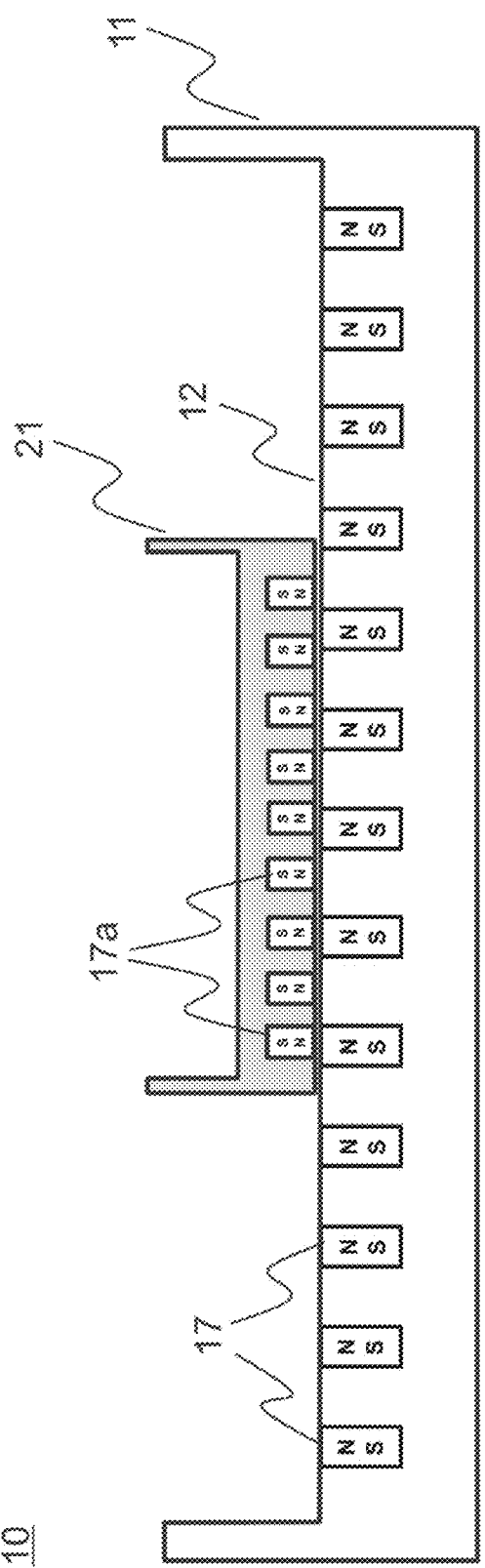

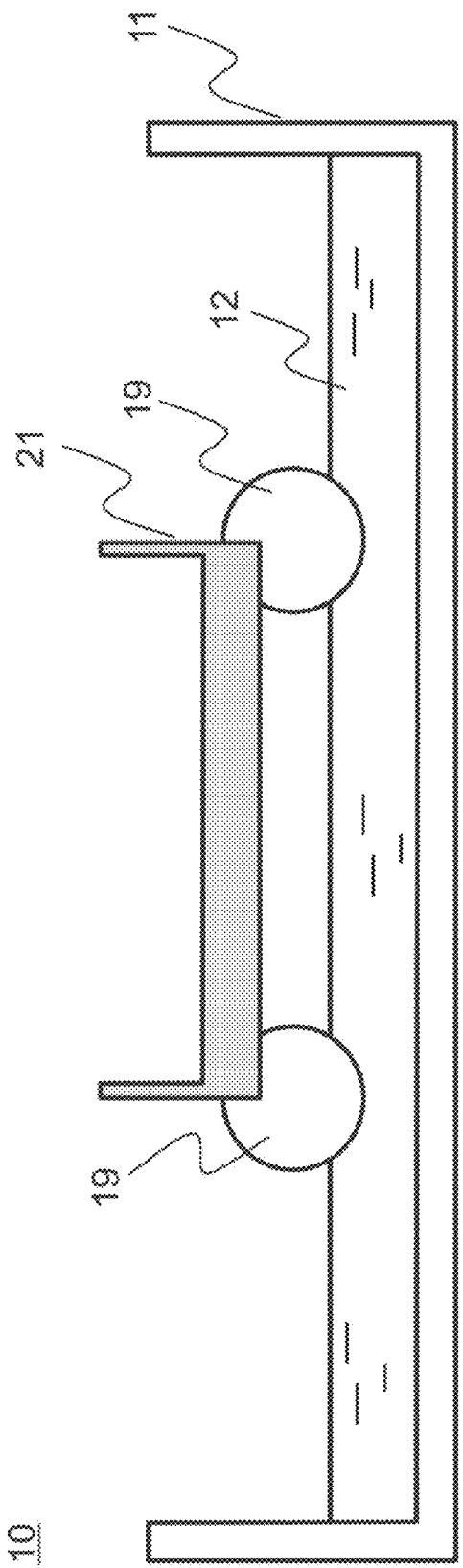

MOBILE PLATFORM ARRANGEMENT

FIELD OF THE INVENTION

Present invention relates to apparatuses and methods, intended to provide aid in monitoring brain processes in awake and conscious small laboratory animals, such as rodents.

BACKGROUND

Mammalian brain is a complex, intricately organized organ responsible for information processing, cognition and behavioural responses to environmental challenges. Currently two major classes of methodological approaches, such as electrophysiology and imaging/microscopy are used to study brain function and pathology in mammals. Electrophysiological methods range from activity registration of cell ensembles either by electroencephalography (EEG) or by means of implanted electrodes and multielectrode arrays to single cell recordings by means of patch clamp technique, for example. Imaging and microscopy methods employ in turn a variety of electromagnetic radiation spectral segments, such as visible or infrared light, X-rays, microwaves, magnetic resonance and the like. For those skilled in art it is clear, that the most common object for conducting laboratory scale experiments on mammals is a small rodent, such as a mouse or a rat. Correspondingly a variety of experimental setup is developed mostly for small rodents. The terms 'animal', 'experimental animal', 'small experimental animal', 'laboratory animal' and the like refer in this disclosure to a small rodent, such as a mouse or a rat.

While low-resolution microscopic imaging and implanted electrode-based electrophysiology experiments are relatively easy to perform on awake and freely moving animal, both single cell recordings and high-resolution imaging experiments on awake and moving animal represent a significant challenge. In accordance with current practice the latter methods are performed either on anesthetized animals (Hofer et al., 2009; Holtmaat et al., 2009) or require utilization of highly specialized devices, such as implanted fiber optics or miniaturized microscope scanning heads (Flusberg et al., 2005; Flusberg et al., 2008). Several technical approaches are known to be available at present for in vivo two-photon microscopy (TPM) in brain tissue of small experimental animal. All these approaches are based on craniotomy (Holtmaat et al., 2009) and similar methods of head fixation under the microscope objective (Holtmaat et al., 2009; Yang et al., 2010). A majority of these approaches are performed on anesthetized animal, which consequently implies a presence of negative side effects from anaesthetics (Larsen and Langmoen, 1998). These side effects are mostly due to the prolonged exposure to anaesthetics or repeated administration of anaesthetics.

It is however clear for those skilled in art that the functionality of unconscious brain may not be considered a suitable object for modelling working brain activity (Nallasamy and Tsao, 2011). Whether anaesthetic agents are to induce changes in precise architecture of neuronal membrane lipid bilayer and act as allosteric inhibitors or activators for different receptors and channel proteins on cellular surface (Chau, 2010), cell physiology, in particular physiology of neurons, in regard to an animal exposed to any anaesthetics may not be considered comparable to that in regard to an animal provided with no anaesthetics.

However, one should face that performed on anesthetized animal repetitive imaging sessions, long imaging sessions or combinations thereof (Hofer et al., 2009; Holtmaat et al., 2009) are still considered as approaches providing at a time present best microscopic results in vivo, although these techniques bear all limitations disclosed above.

In addition to abovementioned physiological limitations caused by anaesthesia, several methodological techniques are known from prior art that are simply not applicable for unconscious animal for technical reasons. That refers, in particular, to classical behavioural paradigms, for example those, utilizing behavioural tasks for animals in a labyrinth. Studies of the kind utilize various cage-like devices adapted to induce specific behavioural responses in an experimental animal. U.S. Pat. No. 3,974,798 discloses a method and an apparatus in the form of cage for studying a behavioural response of an experimental animal to various natural and artificial stimuli, such as vibration of cage floor or conducting a current therethrough. U.S. Pat. No. 7,086,350 discloses an animal cage behaviour system for monitoring complex behaviours in small laboratory animals, such as rats, mice, rabbits, guinea pigs etc., by means of applying thereto widely known tests, such as certain feeding patterns or fluctuating dark-and-light cycles.

Conducting neurophysiological studies on awake and freely moving experimental animal, while obtaining a behavioural response, still represents a problem for scientific community. In other words, a problem still exists of combining advanced modern techniques as two-photon microscopy in brain tissue in combination with classic behavioural tests. Those skilled in art may credibly estimate the scale of abovementioned problem and understand grand importance thereof in modern brain research.

Certain systems exist, providing a partial solution to the abovementioned problem. One of the systems exploits an idea dated back to 1930-s and disclosed in U.S. Pat. No. 1,794,951 and provides a simple device representing a tread wheel on which experimental animal can move only straight forward or backward while its head is fixed under multiphoton microscope during imaging session (Wienisch, 2011). Another much more elegant and advanced system setup utilizes an idea of suspended in the air spherical treadmill (Hölscher et al., 2005), on which animal can walk in different directions while its head is fixed under two-photon microscope during imaging (Dombeck et al., 2007). Combination of spherical treadmill setup with virtual reality system enables tracking the path of an experimental animal and therefore approaches simple behavioural paradigms, such as T-maze (Kendler, 1947).

Above mentioned systems are constrained with several common problems. The first problem is the translation of results, obtained from animal experiments on a curved surface, onto classical behavioural paradigms that are largely based on a prerequisite of a flat surface imitating to some extent natural environmental conditions. The second problem originates from an unnaturally unlimited surface provided by both abovementioned systems (Wienisch, 2011, Hölscher et al., 2005). The problem therefore lies in a lack of sensory stimulating obstacles normally featured in classical behavioural paradigms as well as in natural environmental conditions. Moreover, one of the necessary requirements for realization of existing approaches is a complete reconstruction of a microscopic setup, since the height of mandatory equipment does not otherwise allow fitting abovementioned systems under the microscope. Such reconstruction may cause problems with optical path alignment and furthermore microscopic equipment is not necessarily longer serviced by microscope supplier. Considering the prices on advanced microscopic equipment, loss of supplier warranty may be an important factor preventing complete reinstallation of said equipment.

It is therefore desirable to provide a system and method for bridging a gap between neuronal activity- and behavioral research with relatively simple and accessible realization means.

SUMMARY OF THE INVENTION

The objective of the present invention is to alleviate above mentioned problems by providing a device and method, implemented to link together classical methods of behavioural research, electrophysiological approaches and cutting edge high resolution imaging techniques, in particular two-photon microscopy combined with virtual reality. In particular, present invention allows exploring behavioural aspects of experimental animals in conditions, utmost close to natural and/or familiar environment thereof. Thus, behavioural concepts may be studied upon stimulation by natural obstacles, such as walls, barriers of different shapes and the like, as well as the influence of physiological cues may be explored, such cues as food, drinking water, aversive stimuli and the like. In addition, the invention provides a convenient technical setup requiring minimal rearrangement of already available microscopic equipment, thus implementing an experimental tool equally suitable for both large research centre core facilities and small-scale commercial laboratories.

The objective is achieved by implementing a mobile platform arrangement to be integrated into a standard laboratory setup for neuronal research, such as a multi-photon microscope, for example, and method of operation thereof, said mobile platform arrangement comprises a first platform, provided as a shallow flat-bottomed container with an outer diameter d, positioned within a second platform, provided as a flat-bottomed member with a diameter at least 2d, wherein the top surface of the second platform is advantageously provided with a friction reducing surface structure; wherein the friction reducing surface structure of the second platform is adapted to significantly reduce friction between the first and the second platforms; wherein the first platform is arranged to perform unobstructed gliding motion along and/or over the friction reducing surface structure of the second platform and wherein the gliding motion of the first platform along and/or over the friction reducing surface structure of the second platform is enabled by reduced friction between platforms.

In preferred embodiment the first platform is implemented as a shallow flat-bottomed cylindrical dish or container with an outer diameter d. For clarity purposes the first platform is further referred in this disclosure as a "mobile platform". The mobile platform is preferably implemented of such a size to freely accommodate a small experimental animal. The second platform is implemented in the form of a flat-bottomed member, provided with boundaries, whose diameter within boundaries is at least two outer diameters (2d) of the mobile platform. For clarity purposes the second platform is further referred in this disclosure as a "support platform". The mobile platform is positioned onto and/or within the surface of the support platform delimited by boundaries, such as a top surface of the support platform, for example. The provision of the support platform makes it possible to reduce friction between bottom of the mobile platform and the top surface area of the support platform and to support a gliding motion of the mobile platform along and/or over the top surface of the support platform. Friction reduction is achieved by providing said boundary-delimited top surface area of the support platform with a surface structure adapted to substantially reduce friction between platforms, defined further in this disclosure as a "sliding surface". Motion of the mobile platform along and/or over the sliding surface of the support platform is mediated by small experimental animal unrestrictedly moving within the mobile platform.

In one embodiment the support platform is implemented in the form of a flat-bottomed container with its top surface surrounded by sidewalls. Top surface of the support platform, thus enclosed within the sidewalls, may be referred as a floor surface, in accordance with this embodiment.

In one embodiment the support platform is implemented in the form of a flat-bottomed platform in the form of a plate, such as a disc, for example, with a flat top surface delimited by edge-like boundaries.

In one embodiment the support platform is provided with an even sliding surface structure in the form of an additional element arranged at a certain height from the top surface of the support platform. The sliding surface substantially duplicates the top surface of the support platform by size and shape and is strictly parallel thereto. In fact, the support platform is thus provided with a double surface with an interspace formed between an "upper" surface, herein provided by the sliding surface, and a "lower" surface, herein provided as a floor surface area of the support platform. Sliding surface comprises multiple apertures arranged at a predefined distance from each other. A constant uniform air flow is supplied through the apertures to enable the mobile platform to perform smooth unobstructed motion, referred herein as gliding, over the sliding surface on thus created air cushion. Air flow is supplied via an air compressor or any other technically suitable air flow supply device. Any other nonhazardous gas technically suitable for the purposes of the invention may be utilized.

In some embodiments an external surface of the mobile platform is provided with a circumferential projection arranged along a perimeter thereof in the form of plastic skirt.

In some embodiments an external surface of the mobile platform comprises recesses that may be arranged concentrically and/or into patterns. Recesses may be provided in the form of grooves, clefts, cavities and the like. Recesses are configured to facilitate uniform air supply to an external bottom of the mobile platform as to enable gliding motion thereof in accordance with previous embodiment.

In one embodiment the support platform is provided with a sliding surface structure in the form of a surface component manufactured from a material with reduced friction coefficient and additionally covered with a lubricant.

In one embodiment both the support platform and the mobile platform incorporate arrays of magnets, wherein each magnet is in the form of a bar, a cylinder or the like having two poles, north and south, and of a suitable size to be integrated into each platform. Magnetic arrays are preferably arranged so that the north poles of both mobile- and support platforms magnets face each other. Friction reduction between support- and mobile platforms is thus caused by magnetic repulsion, and, respectively, gliding motion of the mobile platform along and/or over the support platform is realized by means of magnetic levitation.

In one mostly additional embodiment, the mobile platform and/or the support platform may comprise electromagnets incorporated therein.

In one embodiment the support platform is provided with a sliding surface structure formed by bearing array(s).

In one embodiment the support platform is provided in the form of a liquid-filled container, wherein liquid-air interface forms a sliding surface for the mobile platform.

Mobile platform is in turn provided with a support cushion enabling mobile platform to float on a liquid surface.

It is another subject of the invention to provide a mobile platform arrangement comprising means for securing an awake and conscious small experimental animal.

In some embodiments means for securing an experimental animal comprise a head adapter and a support stand for the head adapter, which stand is fixedly or releasably mounted on the support platform or alternatively fixed at close proximity thereto. Head adapter provides rigid fixation of animal's head and ensures static position of animal's head in regards to the support platform. An animal is otherwise free to move within the borders defined by the sidewalls or of the mobile platform while its head remains rigidly fixed by the head adapter. The support stand is configured as mounting means the head adapter while not affecting motional freedom of the experimental animal within the mobile platform. An experimental animal moves within the mobile platform thus mediating mobile platform to perform gliding motion on and/over the sliding surface of the support platform.

In some embodiments the mobile platform of a substantially rectangular shape is provided.

In one aspect of the invention, a method to operate a mobile platform arrangement comprising means for securing an experimental animal is provided.

In another aspect of the invention, a method for obtaining experimental data on neuronal activity of awake, conscious and freely moving on the mobile platform arrangement animal is provided.

Different embodiments of the present invention will become apparent by consideration of the detailed description and accompanying drawings.

BRIEF DESCRIPTION OF THE DRAWINGS

FIG. 2B is a side view of an exemplary mobile platform arrangement of FIG. 1.

FIG. 4A illustrates an exemplary mobile platform arrangement, wherein the support platform is provided with a sliding surface covered with lubricant; side view, vertical cross-cut.

FIG. 4B illustrates an exemplary mobile platform arrangement, wherein both support platform and mobile platform incorporate arrays of magnets; side view, vertical cross-cut.

FIG. 4D illustrates an exemplary mobile platform arrangement, wherein the support platform is provided in the form of a liquid-filled container and the mobile platform is stabilized on a liquid surface by means of ring-shaped support cushion; side view, vertical cross-cut.

DETAILED DESCRIPTION OF THE EMBODIMENTS

Figure 1A:
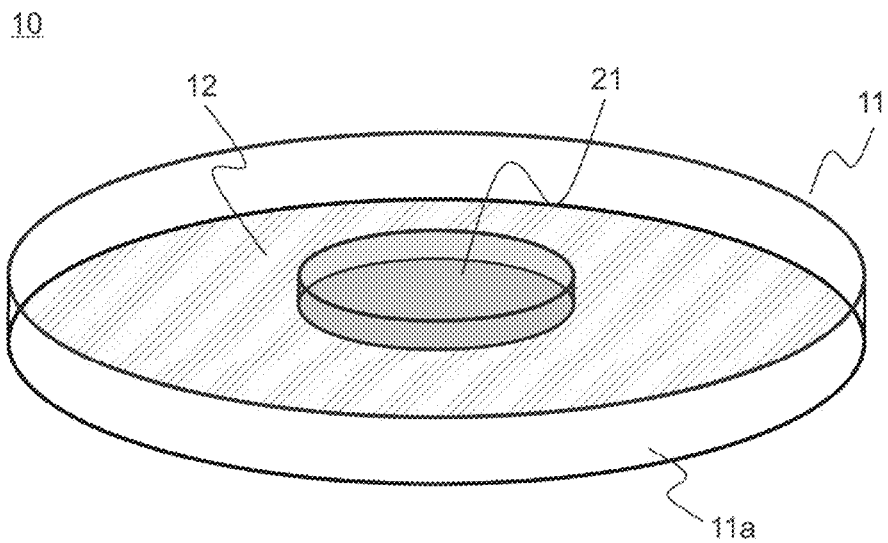
FIG. 1A illustrates a generalized concept of a mobile platform arrangement in accordance to some embodiment, wherein a support platform is provided in the form of a container with sidewalls.

Detailed embodiments of the present invention are disclosed herein with the reference to accompanying drawings. The same reference characters are used throughout the drawings to refer to same members. Following citations are used for the members:

10—mobile platform arrangement;
11—a support platform;
11a—a sidewall of the support platform extending above the sliding surface;
12—a sliding surface of the support platform;
13—an air duct;
14—height of the sidewall of the support platform;
14a—height on which the sliding surface is arranged, in accordance with one embodiment;
15—apertures for air supply;
16—air flow chamber, defined as an interspace formed between a sliding surface 12 and a floor surface area of the support platform, in accordance with one embodiment;
17—magnetic array of the support platform;
17a—magnetic array of the mobile platform;
18—bearing elements;
19—a support cushion;
21—a mobile platform;
22—a cross section defining an external bottom of the mobile platform;
23—recesses arranged at the bottom of the mobile platform;
24—projection arranged at the bottom of the mobile platform along a perimeter thereof;
31—an adapter for animal's head;
32—holes for connectors, provided to connect head adapter to mounting means;
33—central aperture in the head adapter;
42—mounting means for head adapter realized as a support stand with pivot arm;
51—a small rodent animal.

A mobile platform arrangement 10 is provided (FIGS. 1A-B), comprising a mobile platform 21 and a support platform 11. In accordance with the preferred embodiment the mobile platform 21 is implemented as a shallow solid flat-bottomed cylindrical container or dish with an outer diameter d. The term "outer diameter" refers in this disclosure to a maximum diameter of an object, herein, the mobile platform 21. The mobile platform 21 in accordance to this embodiment comprises an interior surface area surrounded by sidewalls.

Term "external surface" or "bottom" in regard to the mobile platform 21 may further refer in this disclosure to that part of the mobile platform directly facing the support platform; and the term "floor" may further refer to an interior surface area of the mobile platform surrounded by sidewalls.

The size of the mobile platform 21 is preferably sufficient to accommodate a small experimental animal, such as a mouse, for example, so, that an animal has a certain freedom of movement within the borders of the mobile platform, naturally defined by walls of the container. Diameter d may be about 15 cm, whether an experimental animal is a mouse, however, the size of the mobile platform naturally depends on the size and weight of an animal, diameter d thus ranging 15-20 cm depending on experimental setup. An experimental animal is thus free to walk within the mobile platform 21. The weight of the mobile platform 21 is preferably adjusted to approximately match the weight of an experimental animal it accommodates.

The mobile platform 21 is positioned within or onto the support platform 11.

In accordance with the preferred embodiment, the support platform 11 is implemented as a solid flat-bottomed cylindrical container whose inner diameter equals at least two outer diameters (2d) of the mobile platform thus ranging 30-40 cm (FIG. 1A). The support platform 11 of this embodiment is provided by sidewalls 11a that define boundaries of the support platform. The term "inner diameter" refers in this disclosure to a diameter defined by inner boundaries of an object, herein the support platform 11, in particular to the diameter of a floor surface within sidewalls 11a of the support platform 11. The term "floor" in regard to the support platform 11 may further refer to an interior surface area of the support platform surrounded by sidewalls 11a. Height of sidewalls may range 3-10 cm.

Figure 1B:
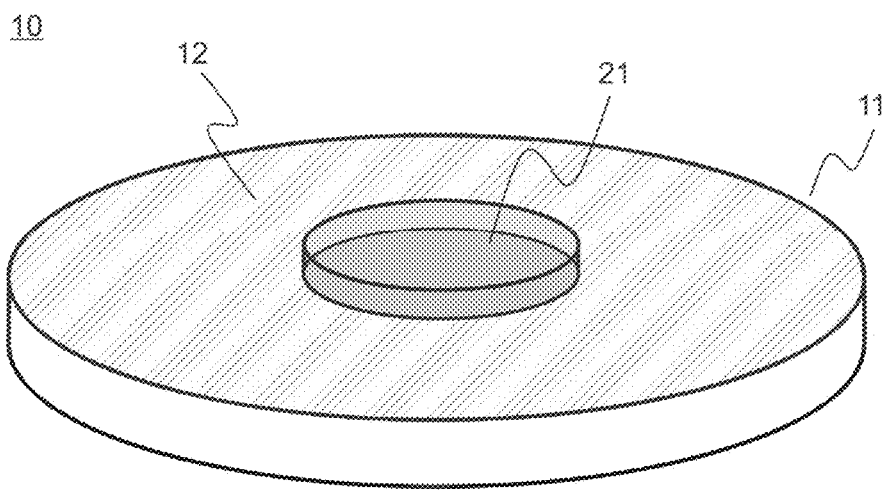
FIG. 1B illustrates a generalized concept of a mobile platform arrangement in accordance to another embodiment, wherein a support platform is provided in the form of a disc-like platform.

In another embodiment the support platform 11 may be realized as a flat-bottomed plate-like platform (FIG. 1B). FIG. 1B shows an exemplary support platform 11 having a disk-like shape; however, other implementations are not excluded. The support platform of this embodiment has a top surface and side edges. Boundaries of the support platform of FIG. 1B are naturally defined by the side edges of the platform. Herein, the mobile platform 21 if positioned onto the top surface of the support platform, which top surface performs same function as floor surface (within sidewalls) of FIG. 1A.

In accordance with any aforesaid embodiment the support platform 11 is provided with a sliding surface structure 12, further referred as a "sliding surface". Sliding surface 12 is configured as a structural element providing and/or supporting unobstructed gliding motion of the mobile platform 21 on/over the surface area defined by the boundaries of the support platform 11. The sliding surface 12 of FIG. 1A is thus defined by a floor surface within sidewalls 11a of the support platform 11; and the sliding surface 12 of FIG. 1B is defined by a top surface of the support platform 11.

Various implementations of the sliding surface structure 12 are disclosed below.

The mobile platform 21 is preferably manufactured from various plastic-based materials, including various types of reinforced plastics; however, any other technically appropriate material for manufacturing thereof is not excluded.

The support platform 11 is preferably metallic; however, any other technically appropriate materials, such as plastics and/or reinforced plastics, for manufacturing thereof are not excluded.

Figure 2A:
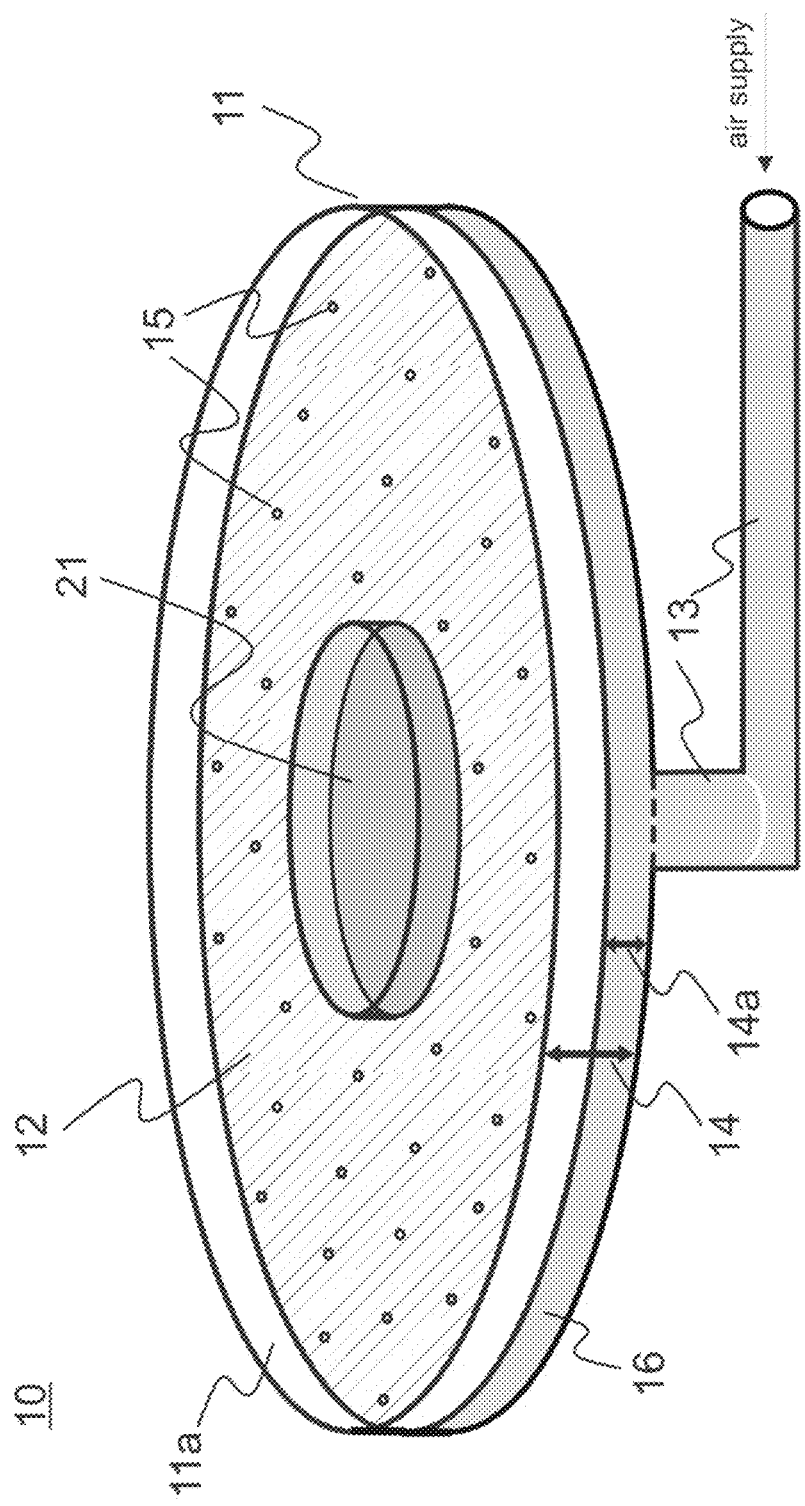
FIG. 2A illustrates an exemplary mobile platform arrangement provided with air supply equipment.
Figure 3A:
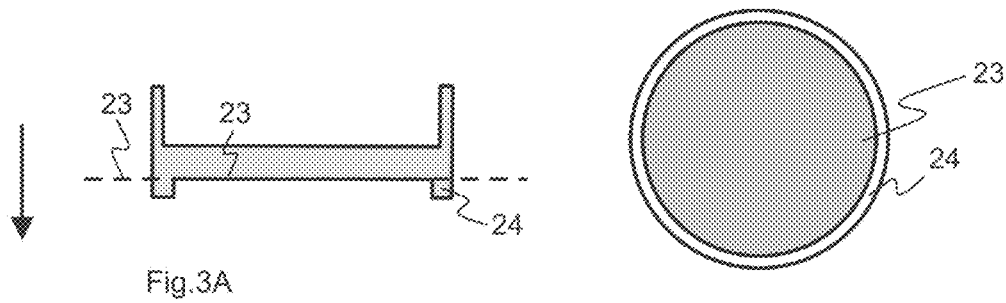
FIGS. 3A-D illustrate various dimensional configurations and surface profiles for an external surface of the mobile platform.
Figure 3B:
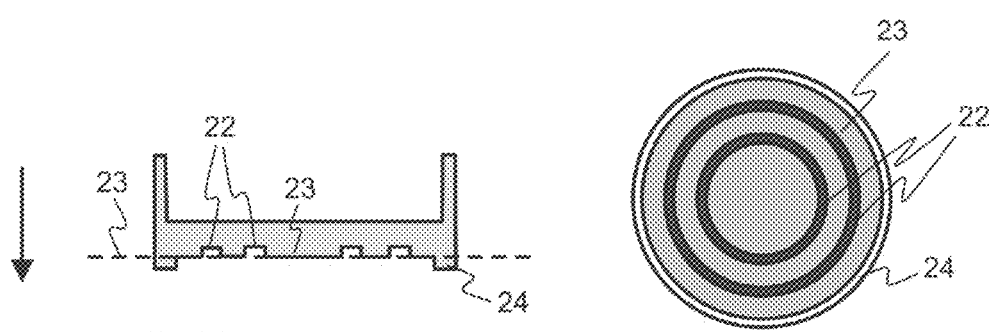
Figure 3C:
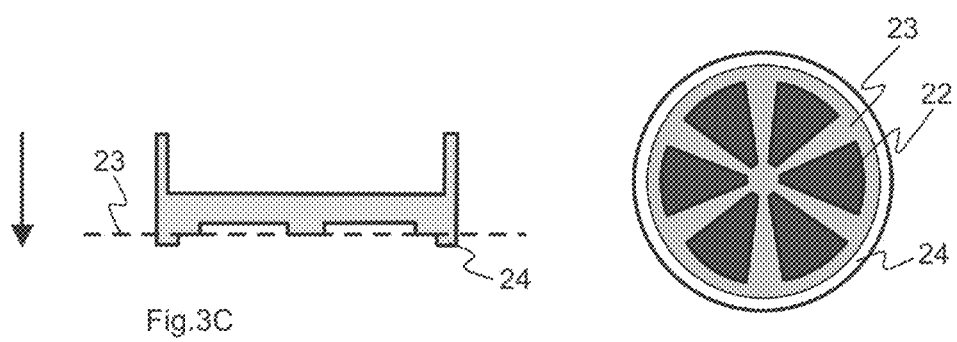
Figure 3D:
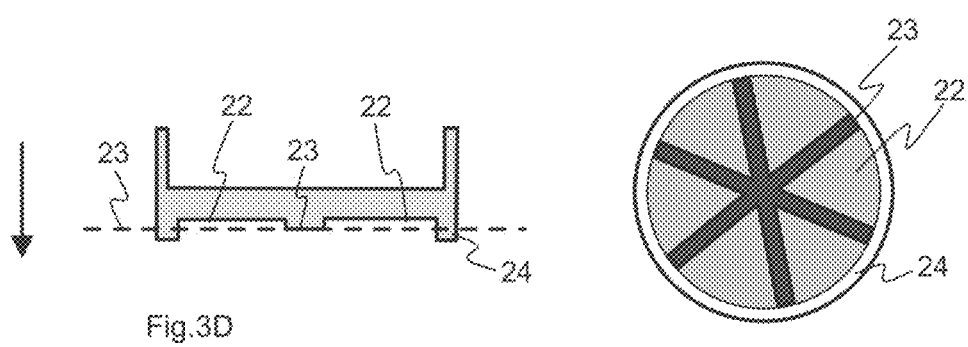

FIGS. 2A and 2B illustrate the mobile platform arrangement 10 in accordance with the preferred embodiment. FIG. 2A illustrates a dimensional arrangement of the sliding surface 12 in regards to the support platform 11. Referring to FIG. 2A, the mobile platform arrangement 10 comprises the mobile platform 21 and the container-like support platform 11 with sidewalls 11a. The height of a support platform 11, defined herein as a distance between the floor of the support platform and an upper sidewall edge, is designated as 14. The support platform 11 is provided with an even sliding surface 12, configured herein as an additional structural element arranged at certain height 14a from the floor of the support platform. Sliding surface 12 cross-sectionally substantially duplicates floor area of the support platform 11 by shape and size and is strictly parallel thereto. In accordance with this embodiment the support platform 11 is in fact provided with a double surface, wherein a substantially closed interspace is formed between the sliding surface 12 and the floor area within the support platform. This interspace is further referred to as 16. Installation of the sliding surface 12, as defined in this embodiment, into the support platform may be performed by gluing, soldering or other means of insertion or mounting within the container defining the support platform 11. Sliding surface 12 is configured to comprise multiple apertures 15 arranged at a predefined distance from each other. Apertures 15 are about 1-2 mm in diameter and are preferably situated at a distance of about 10-30 mm from each other. Distance between all apertures may be equal or may vary between individual apertures. Constant uniform air flow is supplied through apertures 15 to substantially reduce friction between platforms and enable the mobile platform 21 to glide over the sliding surface 12 on thus created air cushion. Two-dimensional arrangement of apertures 15 is preferably such to provide an optimal distribution of air streams over the sliding surface 12. An interspace 16 may thus be defined as an air flow chamber. Chamber 16 enables internal air circulation necessary to provide uniform air distribution into apertures 15. Air to chamber 16 is supplied under pressure through a connector inlet (not shown) via duct 13 and by means of an air compressor (not shown) or any other technically suitable device. Central location of duct 13 in regard to the bottom of the support platform 11, as well as angled bend thereof, is exemplary and not to be interpreted as technical features limiting the invention. For those skilled in art it is clear, that duct 13 may be arranged elsewhere within the bottom or sidewalls of the support platform, and that duct 13 may be bent, curved, inclined or remain straight, whether technically appropriate. Other nonhazardous gas may be utilized instead of air.

The sliding surface 12 in accordance to this embodiment is manufactured from plastic materials; however, other appropriate materials for manufacturing thereof are not excluded.

FIG. 2B illustrates the mobile platform arrangement 10 from sideways and shows position of the mobile platform 21 in regard to the sliding surface 12 of the support platform in more detail. FIG. 2B is therefore a vertical cross-cut of the mobile platform 21 placed onto the sliding surface 12 of the support platform 11. In accordance to some embodiment, an external surface of the mobile platform 21 is provided with a circumferential projection 24 arranged downwards along a perimeter of the external surface, a so called skirt. For clarity purposes said external surface of the mobile platform 21 is designated as 22. The external surface 22 thus faces the sliding surface 12 of the support platform 11. Profile of the projection 24 substantially duplicates sidewall profile of the mobile platform 21. Height of the projection 24 from an external surface 22 downwards ranges 3-15 mm Projection 24 is preferably manufactured from plastic. Mobile platform 21 may be manufactured as a whole with the projection 24 or otherwise element 24 may be manufactured as an additional circumferential component and further fixed onto the external surface of the mobile platform 21 during manufacturing process.

In accordance with one embodiment, an external surface 22 of the mobile platform also may comprise recesses 23. For clarity purposes the external surface 22 is additionally indicated by a dashed line (FIG. 2B), which performs functions of a baseline and indicates a base level for the bottom of the mobile platform apart from projection 24 and/or recesses 23.

Recesses 23 may be arranged concentrically and/or into patterns. Recesses may be provided in the form of grooves, clefts, cavities and the like.

Both projection 24 and recesses 23 are configured to facilitate uniform air distribution over an external surface 22 of mobile platform 21, so that air streams, supplied through apertures 15 of the sliding surface 12 of the support platform 11, distribute uniformly over the bottom of the mobile platform 21. A substantial friction reduction between platforms is thus achieved, namely between the sliding surface 12 of the support platform 11 and the bottom of the mobile platform 21. Gliding movement of the mobile platform 21 over the sliding surface 12 of the support platform is therefore facilitated.

Two-dimensional arrangement of elements 23 and 24 provides optimum stability for a mobile platform during its movement over the sliding surface 12 of the support platform.

Possible provisions of the mobile platform 21 are illustrated by FIG. 3A-3D as vertical cross-cuts (left) and views from below (right). Various profiles for the external surface 22 of the mobile platform 21 are thus shown. An external surface 22 is additionally indicated by a dashed line (left) in accordance with description above. Two-dimensional surface profiles on the right show an external surface of the mobile platform 22 (grey) as base level, a projection 24 (white) as a part above the base level, and recesses 23 (dark grey) as parts below the base level. Arrows on the left indicate reference direction pointing upwards the base level with reference to surface profiles on the right.

A gliding motion of the mobile platform 21 over the support platform 11 in accordance with this embodiment is thus realized in terms of aerodynamic levitation. While air is supplied through apertures 15 in the sliding surface 12 of the support platform 11, friction between the mobile platform 21 and the sliding surface 12 is reduced and gliding motion of the mobile platform 21 over the sliding surface 12 is facilitated. An awake and conscious small experimental animal, such as a mouse, for example, is placed into the mobile platform 21. An experimental animal, naturally, moves inside the mobile platform 21, thus applying dynamic external force onto the mobile platform. The dynamic force provides necessary acceleration for the mobile platform the glide along the sliding surface. An animal thus mediates gliding motion of the mobile platform 21 within the support platform 11 by free trajectory by imposing an external acceleration force to the mobile platform 21.

FIG. 4A provides a vertical cross-cut for the mobile platform arrangement 10 in accordance to another embodiment. The support platform 11 is thus provided with the sliding surface structure 12, realized as an additional component manufactured from a material with reduced friction coefficient and additionally or alternatively covered with a layer of lubricant. The sliding surface may be represented directly by the boundary-limited surface area of the support platform, in accordance with certain embodiments. In other words, the sliding surface 12 may be provided as a whole with the support platform 11 or alternatively it may be provided as an additional plate-like element manufactured from the material with reduced friction coefficient, which plate-like element will be further fixed onto a support platform during manufacturing process. The sliding surface 12 may thus be realized as a polished surface, for example. The sliding surface 12 is additionally or alternatively covered with a layer of lubricant, such as oil, for example. A lubricant is uniformly spread over the sliding surface 12 forming a sleek coating, which enables mobile platform 21 to perform smooth gliding motion on the sliding surface 12 of the support platform 11. In order to further facilitate gliding motion, also an external surface of the mobile platform 21 may be realized in this embodiment as an even surface with friction-reduced characteristics, such as a polished surface, for example.

FIG. 4B provides a vertical cross-cut for the mobile platform arrangement 10 in accordance to some other embodiment. The gliding motion of the mobile platform 21 along the sliding surface 12 of the support platform 11 is realized herein in terms of magnetic repulsion. Both support and mobile platforms incorporate arrays of magnets, wherein each magnet in an array is provided in the form of a bar, a cylinder or the like having two poles, north and south, and of a suitable size to be integrated into an appropriate part of a corresponding platform. Magnetic arrays are arranged so that the north poles of both mobile- and support platforms magnets face each other.

The support platform 11 is thus provided with an array of individual magnets 17 incorporated, depending on an implementation, within a floor or within a top surface thereof so, that north poles of array magnets point upwards, i.e. towards an external surface of the mobile platform 21. Individual magnets 17 of the support platform array are preferably, but not exclusively, arranged chequerwise.

The mobile platform 21 is in turn also provided with an array of individual magnets 17a incorporated within a bottom thereof. Individual magnets of the mobile platform array are arranged with their north poles pointing downwards, i.e. towards the floor surface (or top surface) of the support platform 11 and, respectively, towards north poles of the support platform array magnets 17. Magnets 17a of the mobile platform array are preferably, but not exclusively, arranged concentrically.

The sliding surface 12 herein is formed as an interface created between the mobile- and the support platforms as a result of magnetic repulsion between arrays of individual magnets 17 and 17a. Phenomenon of magnetic repulsion thus causes substantial friction reduction between platforms and facilitates gliding motion of the mobile platform 21 whether manual or experimental animal-mediated acceleration is applied.

Positioning of individual magnets within an array as well as general dislocation of magnetic arrays within either platform may be varied depending on experimental setup and overall technical implementation.

In accordance with another embodiment, the mobile platform arrangement may be realized in terms of electromagnetic suspension, wherein the mobile platform preferably comprises array(s) of electromagnets and the support platform is provided with a magnetically conducting surface.

Figure 4C:
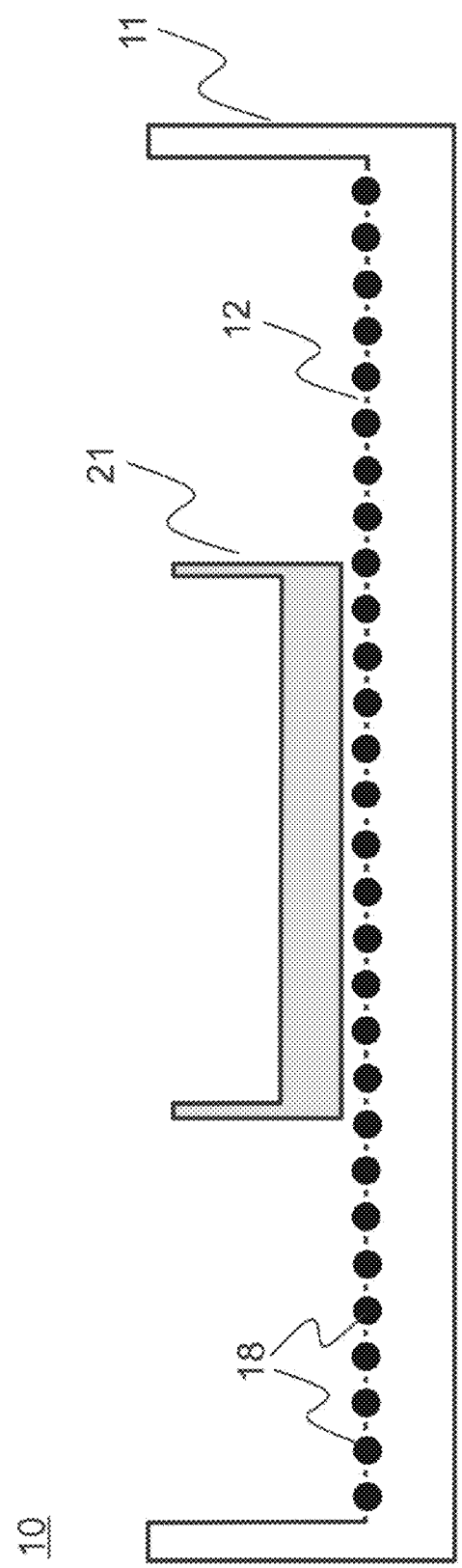
FIG. 4C illustrates an exemplary mobile platform arrangement, wherein the support platform is provided with a sliding surface formed by a bearing array; side view, vertical cross-cut.

FIG. 4C provides a vertical cross-cut for the mobile platform arrangement 10 in accordance to some other embodiment, wherein the support platform 11 is provided with a sliding surface structure 12 formed by bearing array(s). Bearing array(s) comprise bearing elements 18, such as ball bearings, for example, arranged concentrically, linearly, diagonally, chequerwise or in any other technically appropriate way. The mobile platform 21 in accordance to this embodiment is preferably provided with an even external surface with friction-reduced characteristics, such as a polished surface, for example.

FIG. 4D provides a vertical cross-cut for the mobile platform arrangement 10 in accordance to some other embodiment. The support platform 11 is advantageously implemented as a container or a tank. Support platform 11 preferably contains liquid. The liquid may be provided as a glycerol-water mix, for example, however other technically appropriate options are possible. Sliding surface 12 is formed by a liquid-air interface in the tank. Mobile platform 21 in accordance with this embodiment is, in turn, provided with a buoyant element manufactured advantageously in the form of a support cushion 19. The support cushion 19 may be manufactured as a separate element and fixed onto the mobile platform further on. Support cushion 19 provides buoyancy to the mobile platform 21 enabling it to float on a liquid surface. The support cushion 19 is adapted to hold the weight of the mobile platform 21 with moving experimental animal within. The shape of the support cushion 19 is respectively adapted to stabilize the mobile platform 21 with moving experimental animal within and to provide optimum balance for the mobile platform while floating on a liquid. The support cushion 19 may be realized as doughnut-shaped Styrofoam balloon, an air filled tire and the like. FIG. 4D thus shows a doughnut-shaped support cushion 19 vertically crosscut. The support cushion may comprise one or more sections. Other technical implementations of the support cushion are not excluded, as long as it meets the requirement of providing sufficient buoyancy to the mobile platform with moving experimental animal within to keep the mobile platform afloat on a liquid surface.

A mobile platform arrangement 10, comprising means for securing conscious and wake small experimental animal, is provided. Said means comprise a head adapter and mounting equipment for head adapter. Head adapter is rigidly fixed on experimental animal's head. The provision of mounting equipment for head adapter is such to provide an experimental animal with a head adapter fixed on its head freedom of movement within certain borders. The borders are thus technically set by a mobile platform arrangement 10.

Figure 5:
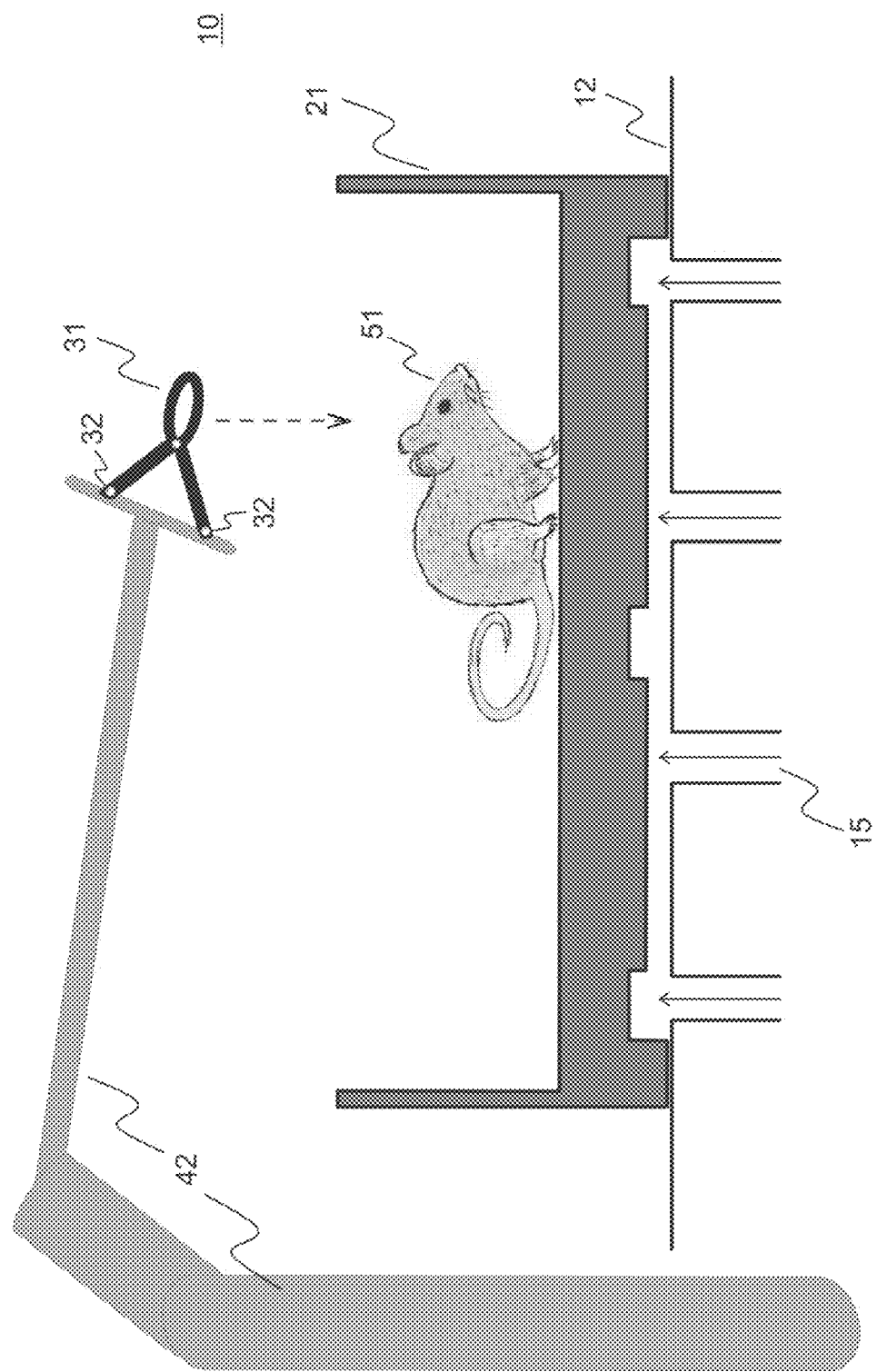
FIG. 5 illustrates an exemplary mobile platform arrangement comprising means for securing an experimental animal.
Figure 6:
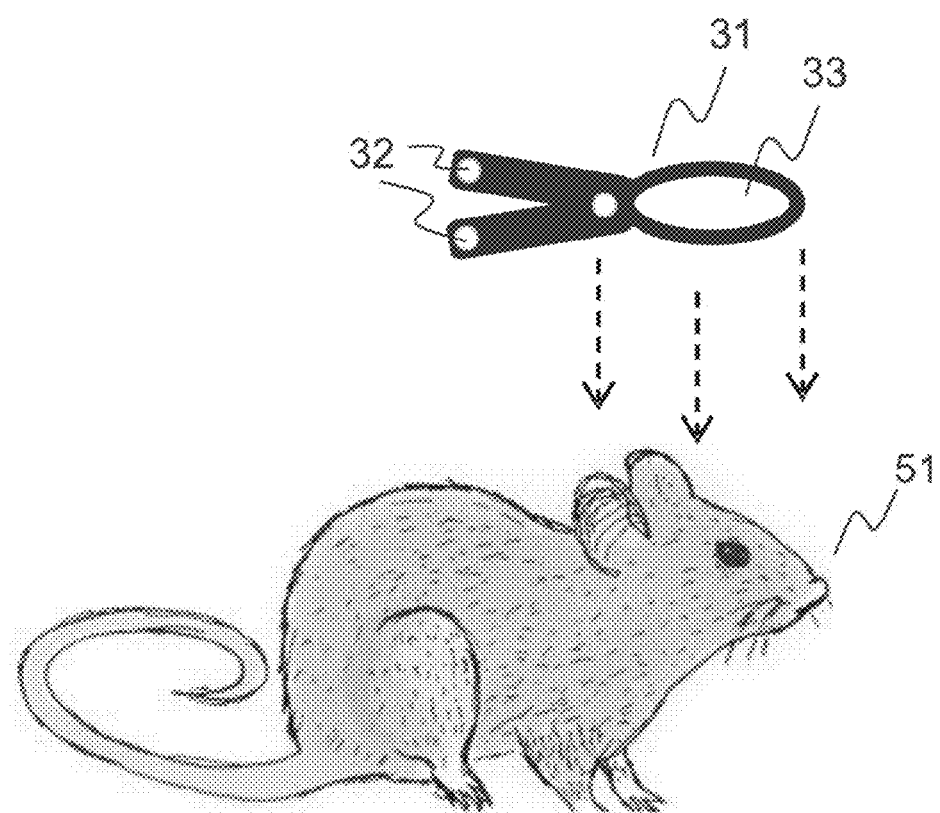
FIG. 6 illustrates an experimental animal and the head adapter for being fixed on animal's head.

FIG. 5 illustrates a mobile platform arrangement 10 comprising means for securing an experimental animal 51 in accordance with one embodiment. Head adapter 31 is thus provided to be secured onto experimental animal's 51 head (further illustrated by FIG. 6). Head adapter comprises a central aperture 33 and connectors 32. Head adapter and means for securing thereof on an experimental animal comprise a known state-of-art and are not described further in this disclosure. An experimental animal 51 is positioned within the mobile platform 21, which is, in turn, positioned within the support platform. The support platform shown on FIG. 5 is implemented in accordance with any aforesaid embodiment.

In one embodiment the mounting means for head adapter 31 are realized as a support stand 42 (FIG. 5). Support stand 42 may comprise a pivot arm jointly connected to a pillar-like stand. A head adapter 31 is therefore releasably connected to pivot arm by means of connectors, such as screw connectors, for example, that may be fastened through apertures 32. Support stand 42 of one embodiment may be fixedly or releasably mounted onto the support platform 11 or alternatively fixed at a close proximity thereto.

In some other embodiment the mounting means for head adapter 31 may be realized as one or more suspension rods or cords suspended over the mobile platform arrangement 10 and providing necessary fixation means for the head adapter 31. Head adapter may be directly or indirectly connected to suspension rods, wherein indirect connection implies utilization of auxiliary connecting means.

Provision of the mounting means for head adapter (e.g. 42) enables unrestricted movement of an animal 51 with a head adapter 31 fixed on its head within the mobile platform 21 (FIG. 5). The head adapter 31 thus ensures static position of animal's head in regards to the support platform 11. An animal is therefore allowed to move within the borders defined by sidewalls of the mobile platform 21 while its head remains rigidly fixed by the head adapter. Movement of an animal 51 within the mobile platform 21 imposes an acceleration force on the mobile platform and causes the mobile platform to glide on and/or over the sliding surface 12 of the support platform 11 in accordance with previous embodiments.

The operation of the mobile platform arrangement 10 is based on the following. An experimental animal 51 moves within the mobile platform 21 thus applying an external force onto the mobile platform and providing necessary acceleration thereto. This causes the mobile platform to perform smooth gliding movements along the sliding surface 12 of the support platform 11. The sliding surface 12 is the surface with friction-reduced properties, as described above. Since weight of the mobile platform 21 is preferably adjusted to match the weight of an experimental animal it accommodates, as described elsewhere in this document, an animal, in turn, applies same force to make the mobile platform moving along and/or over the sliding surface of the support platform, as it usually applies for carrying its own weight while moving in natural and/or cage conditions. Walking within the mobile platform 21, and thus mediating gliding motion of the mobile platform along and/or over the sliding surface 12 of the support platform 11, presumably evokes in experimental animal a sensation of moving in non-limited two-dimensional space. However, being restricted by sidewalls of the mobile platform 21, an experimental animal presumably receives an illusion of being in familiar and therefore safe conditions, such as a cage, for example, and therefore does not express prominent negative behavioral responses, such as fear, while being placed under an experimental setup. Absence of prominent negative responses of an experimental animal while conducting neuronal research may be an important factor affecting neuronal reactions while establishing behavioral patterns on cellular level.

The mobile platform arrangement 10 in addition to means for securing an experimental animal may be provided with optional accessories and/or auxiliary devices for testing an experimental animal's responses to external stimuli and/or for providing external stimuli. Stimuli may be selected from, but are not limited to visual, audial and/or tactile stimuli. The above said devices may comprise, but are not limited to, a water source, a feed dispenser, means for providing visual stimuli, such as a two- or three-dimensional screen, for example, means for providing tactile stimuli, such as a light electric shock source, and the like. Technical implementation of above said devices depends on overall experimental setup and on the most appropriate method of being installed and/or mounted onto the mobile platform arrangement 10.

Figure 7B:
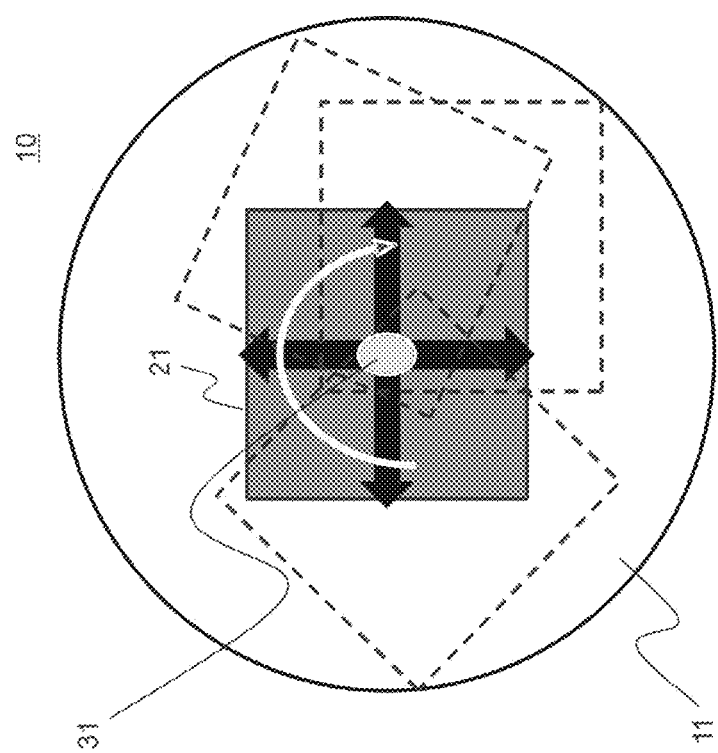
FIGS. 7A and 7B illustrate the mobile platform of circular and rectangular shapes, respectively, and possible motion patterns thereof along and/or over the support platform, wherein motion of the mobile platform is mediated by movements of an experimental animal (not shown) positioned therein.
Figure 7A:
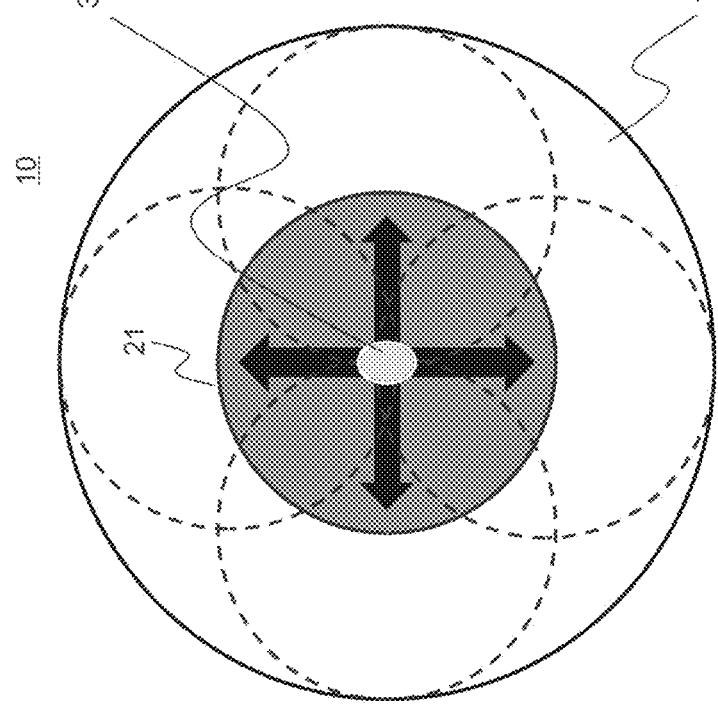

In some embodiments the mobile platform 21 of a substantially rectangular shape is provided. Those skilled in art may understand, however, that geometrical shape of the mobile platform 21 and of the support platform 11 may not be restricted by circle and rectangle. Circular and/or rectangular configurations of the mobile platform suit best for the models of practical implementation and are therefore described in this disclosure. FIGS. 7A and 7B illustrate the mobile platform of circular and rectangular shapes, respectively, with an experimental animal (not shown) secured with the head adapter 31 positioned therein, and possible motion patterns of the mobile platform 21 along and/or over the support platform 11.

The mobile platform arrangement 10 is thus provided as a tool for conducting a complex research combining neuronal- and behavioral studies and involving utilization of modern equipment, such as multi-photon microscopes, and traditional methods of behavioral research by means of providing physiological clues. The equipment is advantageously adjusted to size and weight of a small experimental animal, such as a small rodent. The mobile platform arrangement 10 is thus provided as a tool to conduct a combined neuronal- and behavioral research on moving and wake small experimental animal.

In one aspect of the invention a method to operate the mobile platform arrangement 10, comprising means for securing a conscious, wake and able to move experimental animal 51, is provided, said method comprises:

obtaining the mobile platform arrangement 10 provided with the mounting means 42 for head adapter:

installing the mobile platform arrangement 10 provided with the mounting means 42 for head adapter into a standard laboratory microscopic setup;

obtaining an experimental animal 51;

fixing the head adapter 31 onto an experimental animal's head;

placing an experimental animal 51 onto the mobile platform 21 while the mobile platform is positioned onto the sliding surface 12 of the support platform 11;

connecting head adapter 31 to mounting means 42;

allowing an experimental animal 51 to move within the mobile platform 21;

monitoring a gliding movement of the mobile platform 21 accommodating an experimental animal 51 with its head fixed by the head adapter 31 therealong the sliding surface structure 12;

proceeding with experimental procedures.

In one aspect of the invention, a method for obtaining experimental data on neuronal activity of conscious, wake and able to move experimental animal is provided, wherein said method comprises at least several of the following steps:

obtaining the mobile platform arrangement 10 provided with the mounting means 42 for head adapter:

installing the mobile platform arrangement 10 provided with the mounting means 42 for head adapter into a standard laboratory microscopic setup;

obtaining an experimental animal 51 prepared to have the head adapter fixed onto its head;

fixing the head adapter 31 onto an experimental animal's head;

placing an experimental animal 51 onto the mobile platform 21 while the mobile platform 21 is positioned onto the sliding surface 12 of the support platform 11;

connecting head adapter 31 to mounting means 42;

allowing an experimental animal 51 to move within the mobile platform 21;

monitoring a gliding movement of the mobile platform 21 accommodating an experimental animal 51 with its head fixed by the head adapter 31 therealong the sliding surface structure 12;

placing an objective of the microscope into a central aperture 33 of the head adapter 31;

proceeding with observations and obtaining experimental data;

inducing behavioral response in an experimental animal 51 by providing an experimental animal 51 with physiological stimuli;

observing changes in neuronal activity on cellular level and collecting experimental data.

The above description of various embodiments of the mobile platform arrangement is given by way of example, and not limitation. Mobile platform arrangement, in accordance with the embodiments disclosed herein, is intended to provide a representative basis for teaching one skilled in art to employ the present invention in various configurations in regards to its aspects.

CITED NON-PATENT REFERENCES

1. Hofer et al. Experience leaves a lasting structural trace in cortical circuits. Nature (2009); 457(7227):313-7.
2. Holtmaat et al. Long-term, high-resolution imaging in the mouse neocortex through a chronic cranial window. Nature Protocols (2009); 4(8):1128-44
3. Flusberg et al. Fiber-optic fluorescence imaging. Nature Methods (2005); 2(12):941-50.
4. Flusberg et al. High-speed, miniaturized fluorescence microscopy in freely moving mice. Nature Methods (2008); 5(11):935-8.
5. Yang et al. Thinned-skull cranial window technique for long-term imaging of the cortex in live mice. Nature Protocols (2010); 5(2):201-8.
6. Larsen & Langmoen. The effect of volatile anaesthetics on synaptic release and uptake of glutamate. Review. Toxicol Lett (1998); 100-101:59-64.
7. Nallasamy & Tsao. Functional connectivity in the brain: effects of anesthesia. Neuroscientist (2011); 17(1):94-106.
8. Chau P L. New insights into the molecular mechanisms of general anaesthetics. Review. Br J Pharmacol (2010); 161 (2):288-307. Review.
9. Wienisch et al. Two-photon imaging of neural activity in awake, head-fixed mice. (2012). Neuronal Network Analysis: Neuromethods 67:45-60.
10. Hölscher et al., Rats are able to navigate in virtual reality. J Exp Biol (2005); 208(3): 561-569.
11. Dombeck et al., Imaging large-scale neural activity with cellular resolution in awake, mobile mice. Neuron (2007); 56(1): 43-57.
12. Kendler H H. An investigation of latent learning in a T-maze. J Comp Physiol Psychol. (1947); 40(4):265-270.
13. U.S. Pat. No. 3,974,798. Method and apparatus for studying laboratory animal behavior (1976).
14. U.S. Pat. No. 7,086,350. Animal cage behavior system (2006).
15. U.S. Pat. No. 1,794,951. Exercising device for animals (1931).

The invention claimed is:

1. A mobile platform arrangement (10) comprising:
a first platform (21) with an outer diameter d,
a second platform (11) with a diameter at least 2d, and
means for securing a conscious and awake experimental animal (51), said means comprising a head adapter (31) for fixation on the experimental animal's head and mounting means (42) for the head adapter, said mounting means adjusted to be connected to the head adapter (31) and advantageously disposed at the side of the first platform (11) or at a close proximity thereto,
wherein the first platform (21) and the second platform (11) are implemented as flat-bottomed members;
wherein the first platform (21) comprises sidewalls and a surface area therewithin;
wherein the second platform (11) is provided with boundaries and a surface area therewithin;
wherein the second platform (11) is adapted to accommodate the first platform (21) at the surface area within the boundaries of the second platform;
wherein the surface area within the boundaries of the second platform (11) is provided with a surface structure (12);
wherein the first platform (21) is positioned onto the surface structure (12);
wherein the surface structure (12) is adapted to substantially reduce friction between the first platform (21) and the second platform (11);

wherein the first platform (21) is adapted to perform an unobstructed gliding motion along and/or over the surface structure (12) of the second platform (11) upon providing an external acceleration force to the first platform (21).

2. The mobile platform arrangement of claim 1, wherein the second platform (11) is provided with boundaries defined as sidewalls (11a).

3. The mobile platform arrangement of claim 1, wherein the second platform (11) is provided with boundaries defined as side edges.

4. The mobile platform arrangement of claim 1, wherein an external acceleration force imposed on the first platform (21) is provided by the movement of the experimental animal (51) within the first platform (21).

5. The mobile platform arrangement of claim 1, wherein the surface structure (12) is arranged at a height (14a) from the surface area within the boundaries of the second platform (11).

6. The mobile platform arrangement of claim 5, wherein the surface structure (12) comprises apertures (15) disposed at a predefined distance from each other.

7. The mobile platform arrangement of claim 5, wherein constant uniform nonhazardous gas flow is supplied through apertures (15), which gas flow is adjusted so, to cause a substantial friction reduction between the surface structure (12) of the second platform (11) and the first platform (21), and to enable the first platform (21) to perform an unobstructed gliding motion along and/or over the surface structure (12).

8. The mobile platform arrangement of claim 1, wherein the external surface of the first platform comprises recesses (23) and a projection (24) along a perimeter thereof.

9. The mobile platform arrangement of claim 1, wherein the second platform (11) is provided with the surface structure (12) covered with lubricant.

10. The mobile platform arrangement of claim 1, wherein the first platform (21) incorporates an array of individual magnets (17a) arranged within the bottom thereof and the second platform (11) incorporates an array of individual magnets (17) arranged within the top surface area thereof; wherein disposition of individual magnets (17a) within magnetic array of the first platform (21) in regard to individual magnets (17) within magnetic array of the second platform (11) is such to enable magnetic repulsion between arrays.

11. The mobile platform arrangement of claim 1, wherein the surface structure (12) is formed by a bearing array or bearing arrays comprising individual bearing elements (18).

12. The mobile platform arrangement of claim 1, wherein the second platform (11) is adapted to contain liquid and the first platform (21) comprises a stabilizing element (19) adapted to provide buoyancy to at least the first platform (21) and keep the first platform (21) afloat on a liquid surface.

13. The mobile platform arrangement of claim 12, wherein the stabilizing element (19) is implemented in the form of a doughnut-shaped cushion.

14. The mobile platform arrangement of claim 1 wherein the head adapter (31) provides a rigid fixation of experimental animal's head and ensures static position of experimental animal's head in regard to the second platform (11).

15. The mobile platform arrangement of claim 1, wherein the mounting means (42) is configured to provide the experimental animal (51) with a head adapter fixed on the experimental animal's head with motional freedom within the first platform (21).

16. The mobile platform arrangement of claim 1, wherein the mobile platform arrangement (10) is adapted to be integrated into a standard laboratory microscopic setup.

17. A method to operate a mobile platform arrangement (10) provided with means for securing a conscious, awake and able to move experimental animal (51), said method comprises at least the following steps:
    obtaining the mobile platform arrangement (10) provided with a mounting means (42) for a head adapter:
    installing the mobile platform arrangement (10) provided with the mounting means (42) for a head adapter into a standard laboratory microscopic setup;
    obtaining the experimental animal (51);
    fixing the head adapter (31) onto the experimental animal's head;
    placing the experimental animal (51) onto a first platform (21) while the first platform is positioned onto a sliding surface (12) of a second platform (11);
    connecting the head adapter (31) to the mounting means (42);
    allowing the experimental animal (51) to move within the first platform (21);
    monitoring a gliding movement of the first platform (21) accommodating the experimental animal (51) with the experimental animal's head fixed by the head adapter (31) therealong the sliding surface structure (12);
    proceeding with experimental procedures.

18. A method for obtaining experimental data on neuronal activity of a conscious, awake and able to move experimental animal is provided, said method comprises at least the following steps:
    obtaining a mobile platform arrangement (10) provided with a mounting means (42) for a head adapter:
    installing the mobile platform arrangement (10) provided with the mounting means (42) the head adapter into a standard laboratory microscopic setup;
    obtaining the experimental animal (51) prepared to have the head adapter fixed onto the experimental animal's head;
    fixing the head adapter (31) onto the experimental animal's;
    placing the experimental animal (51) onto a first platform (21) while the first platform is positioned onto a sliding surface (12) of a second platform (11);
    connecting the head adapter (31) to the mounting means (42);
    allowing the experimental animal (51) to move within the first platform (21);
    monitoring a gliding movement of the first platform (21) accommodating the experimental animal (51) with the experimental animal's head fixed by the head adapter (31) therealong the sliding surface structure (12);
    placing an objective of the microscope into a central aperture (33) of the head adapter (31);
    proceeding with observations and obtaining experimental data;
    inducing behavioral response in the experimental animal (51) by providing the experimental animal with physiological stimuli;
    observing changes in neuronal activity on a cellular level and collecting experimental data.

19. The mobile platform arrangement of claim 2, wherein an external acceleration force imposed on the first platform (21) is provided by the movement of the experimental animal (51) within the first platform (21).

* * * * *